United States Patent
Prout et al.

(10) Patent No.: US 9,317,552 B2
(45) Date of Patent: Apr. 19, 2016

(54) REUSING EXISTING QUERY PLANS IN A DATABASE SYSTEM

(71) Applicants: Adam Prout, San Francisco, CA (US); Marko Tintor, San Francisco, CA (US); Alex Skidanov, San Francisco, CA (US)

(72) Inventors: Adam Prout, San Francisco, CA (US); Marko Tintor, San Francisco, CA (US); Alex Skidanov, San Francisco, CA (US)

(73) Assignee: MemSQL, Inc., San Francisco, CA (US)

( * ) Notice: Subject to any disclaimer, the term of this patent is extended or adjusted under 35 U.S.C. 154(b) by 160 days.

(21) Appl. No.: 13/754,333

(22) Filed: Jan. 30, 2013

(65) Prior Publication Data

US 2013/0198166 A1     Aug. 1, 2013

Related U.S. Application Data

(60) Provisional application No. 61/592,440, filed on Jan. 30, 2012.

(51) Int. Cl.
     *G06F 7/00*            (2006.01)
     *G06F 17/30*         (2006.01)

(52) U.S. Cl.
     CPC .... *G06F 17/30442* (2013.01); *G06F 17/30433* (2013.01)

(58) Field of Classification Search
     CPC .............. G06F 17/30395; G06F 17/30967
     USPC .................................................. 707/770, 779
     See application file for complete search history.

(56) References Cited

U.S. PATENT DOCUMENTS

| | | | | |
|---|---|---|---|---|
| 5,546,455 A | * | 8/1996 | Joyce et al. | 379/265.03 |
| 5,875,334 A | * | 2/1999 | Chow et al. | 717/141 |
| 6,768,994 B1 | * | 7/2004 | Howard et al. | |
| 7,631,293 B2 | * | 12/2009 | Alcorn | 717/108 |
| 7,752,197 B2 | * | 7/2010 | Dettinger et al. | 707/721 |
| 2005/0027701 A1 | * | 2/2005 | Zane et al. | 707/3 |
| 2005/0149907 A1 | * | 7/2005 | Seitz et al. | 717/108 |
| 2006/0271557 A1 | * | 11/2006 | Harward et al. | 707/10 |
| 2009/0089312 A1 | * | 4/2009 | Chi et al. | 707/102 |
| 2011/0138401 A1 | * | 6/2011 | Hoffman et al. | 719/318 |

* cited by examiner

*Primary Examiner* — Cheyne D Ly
(74) *Attorney, Agent, or Firm* — Robert M. McDermott

(57) ABSTRACT

A system and method for executing query plans preprocesses a user's queries to identify and extract select parameters of the query, creates a skeletal query with reference to the extracted parameters, creates and compiles an executable version of the skeletal query, then executes the compiled version of the skeletal query using the particular parameters in the current query. The compiled version of the parameterized skeletal query is stored, and when another query is submitted that matches the skeletal query (but with potentially different parameters), the previously compiled skeleton query is executed with the parameters of this latter query.

24 Claims, 3 Drawing Sheets

| QUERY | SKELETAL QUERY FORM |
|---|---|
| Select * from stock where id in(1, 2, 3) | Select * from stock where id in(<@>) |
| | Select * from stock where <C> in(<@>) |
| | Select * from <T> where <C> in(<@>) |
| Select price from stock where id=5 | Select price from stock where id=<@> |
| | Select price from stock where id in(<@>) |
| | Select <C1> from stock where <C2>=<@> |
| | Select <C1> from <T> where <C2>=<@> |
| Select sum(price) from stock where id in(5,6,7) | Select sum(price) from stock where id in(<@>) |
| | Select sum(<C1>) from stock where <C2>in(<@>) |
| | Select <F>(<C1>) from stock where <C2>in(<@>) |
| | Select price from stock where id in(<@>) AS List; SUM (List) |

FIG. 3

```
                    410          412                    414
VISIBILITY void Select_0023 (int threadId, void* threadHandle, MemSqlArrayParam rg,
TableEntry* pTableEntry)
// Boiler Plate Definitions and Initialization //      420
{   Transaction* xact = g_xactMgr->BeginTransaction(READ_COMMITTED,
x_version_create_new, TRANSACTION_ACCESS_READONLY, threadHandle,
threadId, NULL); xact->DoNotTrackReadRefs(); MatchedRowContext matchContext;
    tab_db1_stock* result_db1_stock = NULL; tab_378* keyResult = NULL;
    bool overflow; int keyIndex = 0; TempIncrementalAllocator incAlloc(g_buffMgr);
    AutoIncrArray<key_378> allKeys(&incAlloc, 0 + (rg.endOffset - rg.offset + 1)*1);
    AutoIncrArray<tab_db1_stock> allRows(&incAlloc, 0 + (rg.endOffset - rg.offset +
1)*1);
// End of Boiler Plate //     429
                                                                        430
// Build array of search keys from input MemSqlArray Param, register rg //
                                                                        431
    for(int offset = rg.offset; offset <= rg.endOffset; offset++, keyIndex++)
    { bool overflow;
      StrongType<int64_t> result7(rg.params[offset].int64Value);
      uint8_t resultPrecision7 = 0;
      op_Assign<StrongType<int32_t>, StrongType<int64_t>>(allRows[keyIndex].m_id,
result7, overflow, threadId);
      allKeys[keyIndex].Init(&allRows[keyIndex], 1);
    }         432
// Search keys created //     439
                                        440
// Find each record having at least one match to a key //
    qsort(allKeys, keyIndex, sizeof(key_378), key_378::QSortCmp);
    keyIndex = 0;
    for(int offset = rg.offset; offset <= rg.endOffset; offset++, keyIndex++)   441
    { if(keyIndex == 0 || !(allKeys[keyIndex] == allKeys[keyIndex -1]))
      { key_378& key = allKeys[keyIndex];
        result_db1_stock = ((I_378*)pTableEntry->pIndexesPtr[0])->Search (threadId,
key.GetHashValue(), &key, xact, false/*acquireRowLock*/,
READ_COMMITTED_WITHOUT_OWN_VERSION);
        if((int)result_db1_stock == SELECT_RESULT::SEL_OOM){goto rollbackXact;}
        if (result_db1_stock)
        { MatchedRowResult res = MatchedRow(result_db1_stock, matchContext,
threadId, threadHandle);
          if (res != MatchedRowResult::Continue)
          {result_db1_stock->Release();
            if (res == MatchedRowResult::Commit) goto commitXact; else goto
rollbackXact;}
        }
        if(result_db1_stock) result_db1_stock->Release();
    }
  }       449
}
                      FIG. 4
```

REUSING EXISTING QUERY PLANS IN A DATABASE SYSTEM

This application claims the benefit of U.S. Provisional Patent Application 61/592,440, filed 30 Jan. 2012.

BACKGROUND AND SUMMARY OF THE INVENTION

This invention relates to the field of database searching, and in particular to a method and system for increasing the efficiency of database searches.

As technologies advance, the amount of information that is being stored in electronic form is ever increasing. Correspondingly, the search for particular information becomes increasingly more time consuming.

Database management systems (dbms) are designed to organize data in a form that facilitates efficient search and retrieval of select information. A typical database includes a plurality of "Tables"; each row of the table corresponds to a "Record"; and each column of the table corresponds to an attribute or parameter of each record. For example, a personnel database may include a table of employee addresses. The columns of the table may include a name, employee ID, street address, city, state, zip code. Each employee's record corresponds to a row in the table with employee-specific data in each column. Typical database management systems allow a user to submit a 'query' for finding and retrieving information that satisfies the query. Although a natural language interpreter may be the goal for developers of database management systems, users are required to use a 'query language' to submit such queries. Often, the query is one of a sequence of queries that are sequentially applied, with each query providing an increasingly finer filter for finding the desired information.

An example basic query may take the form of "Select name from tableA", which will return all of the names in the identified table. A more complex form of a query may be in the form of "Select names from tableA, where names begin with 'M'", which will return all of the names in the identified table that begin with M. Even more complex forms of a query may be in the form of "Select from tableA, all names that are also in tableB", "Select from tableA, all names with corresponding addresses having a zipcode that is also in tableB", and so on. As can well be imagined, even with the single query operation "Select", there may be hundreds or thousands of variations of the structure of the command, with potentially an infinite number of particular arguments.

Due to the myriad forms of the queries that a user may submit, in a typical database management system, a query language interpreter parses each query into a series of more primitive operations, commonly termed algebraic expressions, executes code to evaluate each algebraic expression, then presents the results to the user. Such interpretation, however, may consume a significant amount of time, and the sequential execution of the code for each algebraic expression may not be efficient in execution time or memory usage.

It would be advantageous to reduce the time consumed in the execution of a user's query, or sequence of queries. It would also be advantageous to optimize the use of resources in the execution of such queries.

These advantages, and others, can be realized by a system and method that preprocesses the user's queries to identify and extract the query parameters, create a skeletal query with reference to the extracted parameters, creates/compiles an executable version of the skeletal query, then executes the compiled version of the skeletal query using the particular parameters in the current query. The compiled version of the parameterized skeletal query is stored, and when another query is submitted that matches the skeletal query (but with potentially different parameters), the previously compiled skeleton query is executed with the parameters of this latter query.

BRIEF DESCRIPTION OF THE DRAWINGS

The invention is explained in further detail, and by way of example, with reference to the accompanying drawings wherein:

FIG. 3 illustrates an example set of queries and corresponding parameterized skeletal queries.

FIG. 4 illustrates example C++ code for an example skeletal query.

Throughout the drawings, the same reference numerals indicate similar or corresponding features or functions. The drawings are included for illustrative purposes and are not intended to limit the scope of the invention.

DETAILED DESCRIPTION

In the following description, for purposes of explanation rather than limitation, specific details are set forth such as the particular architecture, interfaces, techniques, etc., in order to provide a thorough understanding of the concepts of the invention. However, it will be apparent to those skilled in the art that the present invention may be practiced in other embodiments, which depart from these specific details. In like manner, the text of this description is directed to the example embodiments as illustrated in the Figures, and is not intended to limit the claimed invention beyond the limits expressly included in the claims. For purposes of simplicity and clarity, detailed descriptions of well-known devices, circuits, and methods are omitted so as not to obscure the description of the present invention with unnecessary detail.

The example query processing system is presented using the paradigm of a query processor that overlays and interacts with an underlying conventional database management system. The query processor avails itself of functions and procedures provided by the conventional database management system, and generates executable code, also known as machine code, that interacts with these functions and procedures. One of skill in the art, however, will recognize that the inventive features presented herein may be included within the core of a database management system that adopts these features as included features.

Also, the example query processing system is presented using the paradigm of a database query system that processes queries that are formed using the operations and format of the standard Structured Query Language (SQL). One of skill in the art will recognize, however, that the principles of this invention may be applied for the processing of queries in other languages as well.

As noted above, in a common database query language, there are perhaps thousands of different forms of queries that may be submitted by a user, and conventional query language interpreters are configured to parse each query into a series of more primitive operations. The inventors have recognized, however, that any particular user of the query language is likely to use a limited subset of query forms, and as such, may often repetitively use the same form of a query, albeit with different parameters for each query, may apply the same query to different tables, and so on.

In an embodiment of this invention, each query that is submitted by a user is parsed to identify the particular form of the query, hereinafter termed the 'skeletal' form of the query. If a compiled version of this skeletal query is available, that compiled code is used to execute the query, using the parameters/arguments of the current query. If a compiled form of the skeletal query does not yet exist, the current query may be compiled and stored for potential future use.

Figure 1:
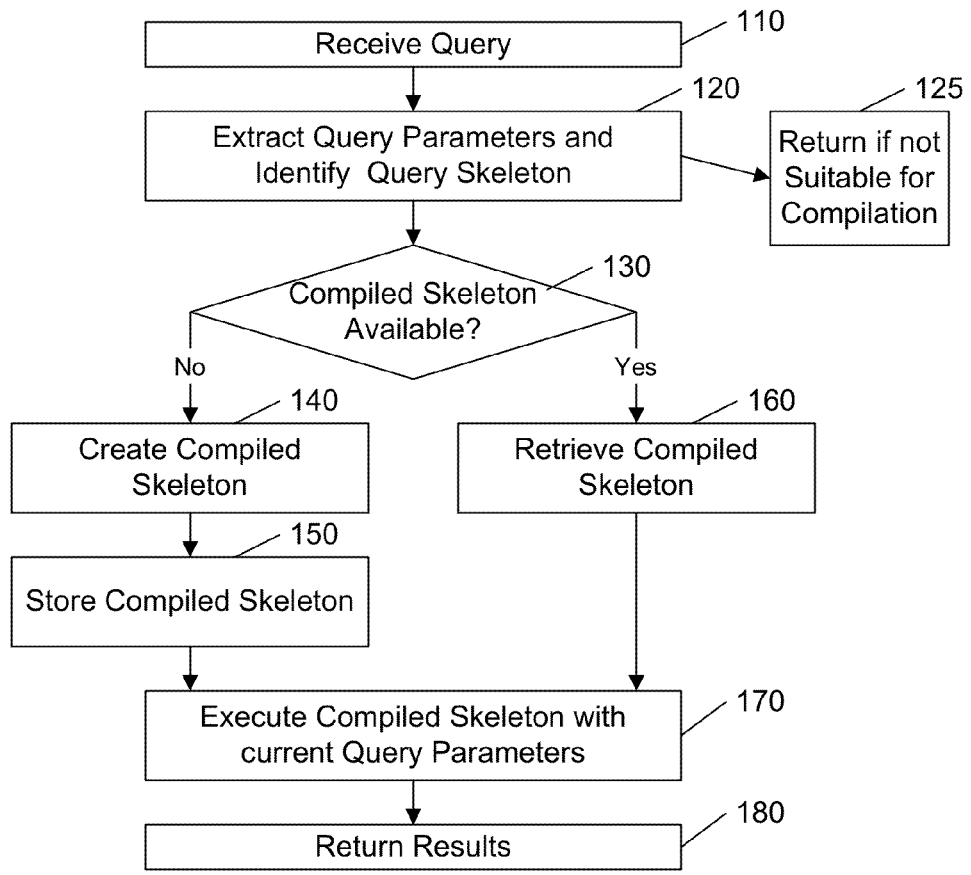
FIG. 1 illustrates an example flow diagram of a query processor in accordance with aspects of this invention.

FIG. 1 illustrates an example flow diagram of a query processor that identifies a parameterized skeletal query, creates and/or retrieves a compiled version of the skeletal query, then executes the query with the parameters of the current query.

At 110, a user's query is received, and at 120, this query is parsed to identify a skeletal form of the query. As the term is used herein, a skeletal form of a query is a form of the query wherein one or more of the parameters of the query are replaced by an identifier of the parameter in lieu of the current value of the parameter. This value-less identifier of a parameter in a current query is termed an argument of the skeletal query.

Consider, for example, two basic queries, such as "Select all records in tableA, with name equal to 'smith', 'jones', or 'brown'", and "Select all records in tableA, with name equal to 'adams', 'nagle', 'harris', or 'kelly'". In a conventional query processor, each of these queries would likely invoke the same set of computer instructions, with the exception that in the first query, a search will be conducted for each of the three match values of 'smith', 'jones', or 'brown', and in the second query, a search will be conducted for each of the four match values of 'adams', 'nagle', 'harris', or 'kelly'.

In an embodiment of this invention, a skeletal form of this basic query may be of the form "Select all record in tableA, with name equal to one of <list>". When a compiled version of this skeletal query is created, it may be created in a parameterized form, wherein the particular list of match values is encoded as an argument to the compiled query. The particular list of match values is provided to the compiled query when the compiled query is invoked ('called'). In like manner, a skeletal form of this basic query may also include the identifier of the column as an argument, such as "Select all record in tableA, with <column> equal to one of <list>".

The particular choice of which parameters to include as arguments that are passed to a compiled skeleton, and which parameters to include as fixed parameters within the compiled skeletal query will be dependent upon a variety of factors. If, for example, the underlying search processes that the compiled code is intended to invoke are configured such that the accessible table(s) must be linked to these processes a priori, passing the table identifier as an argument to a compiled procedure may not be feasible or practical. In like manner, if a query includes a particular arithmetic function, it may be more practical to perform this arithmetic function as a pre-process or a post-process to the compiled skeletal query.

It should be recognized that providing compiled versions of a query does not exclude the conventional use of un-compiled queries. If a particular query is deemed unsuitable for compilation, due to the complexity or uniqueness of the query, or recognition that the conventional processing of this un-compiled query is sufficiently efficient, or other factors, the creation of a compiled version of the query may be bypassed, at 125.

Having identified the skeletal form of the query, and the parameters of the current query (arguments to the compiled skeletal query), a database of stored skeletal queries is searched to determine whether a compiled version of this skeletal query exists, at 130. If such a compiled version exists, it is retrieved, at 160, and invoked, at 170, with the parameters of the current query to satisfy this query. Note that the term "retrieve" is used herein in the general case; if the compiled query had previously been invoked in the current query session and is still resident in the system, a redundant retrieval will not be necessary.

If a compiled version of the skeletal program is not available, at 130, the new skeletal query is compiled, at 140, and stored for later retrieval, at 150. The newly compiled skeletal query is invoked, with the parameters of the current query to satisfy this query, at 170. Techniques for the compilation of queries are well known in the art, such as the technique disclosed in "Efficiently Compiling Efficient Query Plans for Modern Hardware", Thomas Neumann, Proceedings of the VLDB Endowment, Vol. 4, No. 9, pp. 539-550 (September 2011); a sample of a compiled skeletal query is illustrated in FIG. 4, and detailed further below.

Although creating a compiled version of a single skeletal query may be more time and resource consuming than the conventional interpretation and decomposition of a query into a series of primitive operations, the potential savings in execution time using a compiled version of a query, and particularly, the potential savings in interpretation and execution time and resources when a compiled version is re-used, will generally provide for a substantial improvement in the overall execution of the user's queries.

In some embodiments of this invention, the task of compiling the skeletal query may be postponed. For example, if it is found that creating a compiled skeletal query introduces a substantial delay, compared to the conventional interpretation and execution of the query, the process may exit to allow the current query to be conventionally processed, while the creation of a compiled skeletal query is scheduled as a "background" task, to be performed when spare resources are available.

In like manner, instead of creating a compiled skeletal query for each user query, the system may be configured to keep track of the number of times each skeletal query is invoked, and initiate the creation of a compiled skeletal query upon reaching a given threshold of invocations. For example, a compiled skeletal query may be created only for skeletal queries that are repeated at least once. The first occurrence of a query of a particular skeletal form may be processed in the conventional manner, and the second occurrence of a query of this same skeletal form may result in the creation, storage, and execution of a compiled form of this skeletal query.

Figure 2:
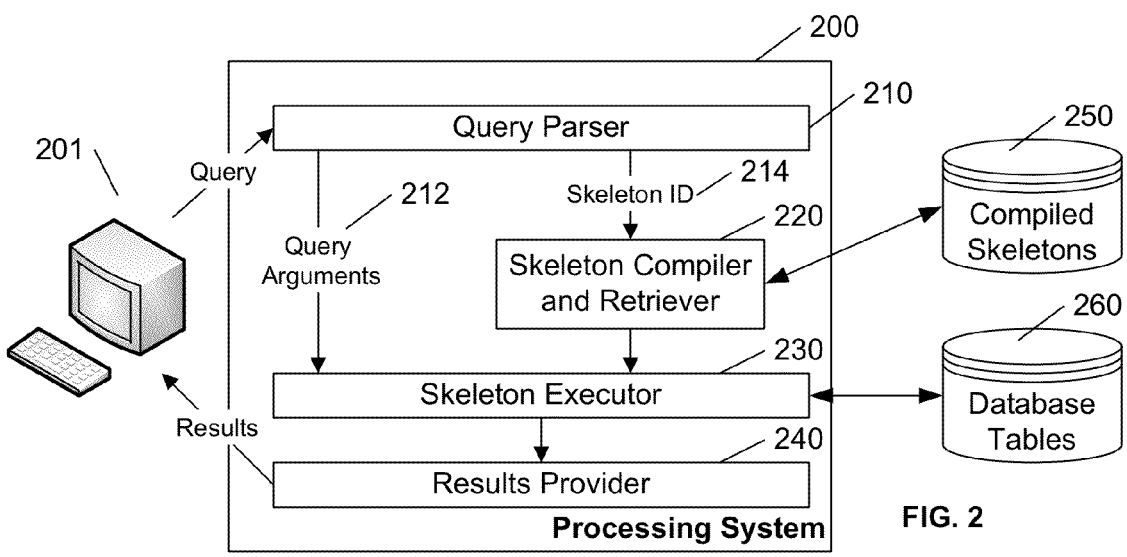
FIG. 2 illustrates an example block diagram of a query processing system that includes a collection of compiled skeletal queries.

FIG. 2 illustrates an example block diagram of a query processing system 200 that includes a collection of compiled skeletal queries 250. As noted above, albeit not illustrated in FIG. 2, if at any point in the processing of the user query, the query processing system 200 determines that the functions provided by its components are not to be applied directly to the current user query (e.g. due to a cancellation or postponement of the creation of a compiled skeleton query), some or all of the current query that is not to be executed directly by the query processing system 200 may be returned to the underlying system to be processed in the conventional manner.

The query parser 210 is configured to receive and parse a query from a user terminal 201. If the query statement includes nested queries, the innermost query may be parsed, followed by the parsing of each subsequent superior query.

In particular, the query parser 210 identifies parameters contained in the query based on the syntax of the particular query statement, and based on compilation considerations, as detailed above. Upon identifying each parameter that will be extracted from the query to form a skeletal query, the resultant skeletal query form is defined.

Any or all of the parameters of the query may be selected to be arguments in a skeletal query corresponding to the particular query. As noted above, the choice of which parameters to select as dynamic arguments will often be dependent on the expected difficulty in creating a procedure that allows the parameter to be passed to the procedure, as compared to the generally less difficult task of including the parameter directly within the procedure. Including more parameters as arguments to the skeletal query allows that skeletal query to be potentially applicable to more queries than a skeletal query with built-in parameters, because the particular query in the latter case would have to have exactly the same value of these built-in parameters.

The level of difficulty of allowing a parameter to be passed to the skeletal query as an argument may be dependent upon the features of the underlying database management system with which the compiled procedure is to interact; it may also be dependent upon the capabilities and complexity of the generator used to create the skeletal query. For example, the use of numeric or string arguments that are used for selecting matching values in a table is a fairly simple process, and would generally be included in any skeletal query generator. On the other hand, the use of a function name as an argument and the invocation of an embedded function of this name is more complicated, and requires that the underlying system allows for the dynamic linking of the named function; accordingly, in some embodiments of the skeletal query identifier and generator, function names may not be included in the types of parameters that may be passed as arguments to a skeletal query.

One of skill in the art will recognize that once the set of types of parameters that may be passed as arguments is defined, the parsing of a given query to determine which parameters in the particular query may be passed as arguments is straightforward. Parameters that are not passed as arguments to the skeletal template will either be included in generated skeletal query procedure, and correspondingly the compiled skeletal query, or be handled as pre-processes or post-processes to the skeletal query.

With particular reference to functions that are included in a query, the execution of the function may be included within the compiled skeletal query or executed before or after the skeletal query is executed. If, for example, the function is used to provide particular parameter values, such as a set of particular values of a parameter, that function may be executed to generate the particular values and these particular values are passed to the compiled skeletal query. In like manner, if the function is used to perform an operation on a set of selected records (rows), such as summing the values in a particular column of the selected rows, the skeletal query may be structured to return the selected records, and the summing operation may be performed on these returned records as a post-process to the selection query. If a function is not suitable as a pre-process or post-process, it will be included within the template query, either as a specific function within the template query or passed as an argument to the template query, if the template query generator supports the passing of this function as an argument.

FIG. 3 illustrates an example set of user queries and corresponding sets of example parameterized skeletal queries.

The first query 310 is an SQL query that returns all of the records (rows) in the table "stock" that have a value of 1, 2, or 3 in the column "id". This query includes the SQL operational terms of: Select, From, and Where; and has parameters "*" (entire record), "stock", "id", and the match values of 1, 2, and 3.

A variety of skeletal queries 315a-315c, and others, may be defined from the user query 310, depending upon the particular features of the embodiment of the query parser 210 (of FIG. 2). Embodiments of the query parser 210 may parameterize each of the parameters "stock" (the particular table), "id" (the particular column within the table), and "1, 2, 3" (the particular value to be matched to the value in the identified column of the table).

A basic embodiment of the query processor may be configured to parameterize the values that are to be matched, as illustrated by the example query form 315a. The SQL operational terms "Select", "From", and "Where", and the parameters "*", "stock", and "id" are included as integral parts of the query form 315a, whereas the value parameters "1, 2, and 3" are represented by an argument "<@>". Given a compiled version of query form 315a, that compiled query can be used for any search of the stock table for records having particular id values, by passing the particular match values as arguments of the compiled query. To accommodate different sets of match values, including a different number of values included for matching, the value parameters may be passed to the compiled query as elements of a variable length list, as detailed further below.

In a more complex embodiment, the query processor may be configured to also include the column to be searched as an argument in the query form, as illustrated by the "<C>" argument in the query form 315b. In a further embodiment of the query processor, the table to be searched may also be passed as an argument in the query form, as illustrated by the "<T>" argument in the query form 315c.

One of skill in the art will recognize that creating the code for a compilable query that allows for the passing of the table identifier and column identifier may be significantly more complex than creating code that allows for the passing of specified values to be compared to a defined column of a defined table. The benefit of this added complexity is that the resultant compiled code will be substantially generic, allowing it to be used for selecting records in any database based on a match of values within any column of the database. On the other hand, the benefit of the simpler query form is a substantially faster creation and compilation time, even though each variation in column or table parameters will require a unique set of compiled code.

Query 320 includes an additional parameter "price" in the query. As contrast to the "*" parameter in query 310, which returns the entire record for all records that have the specified id value, query 320 will return only the value of the price entry in the record for all records that have the specified id value. Query 320 also includes a single value "5" that is to be matched with the value of id in the stock table.

In a basic embodiment of the query processor, this price parameter is included as an integral element in the skeletal query form, as illustrated in query form 325a. The particular value ("5") of the id parameter that is to be matched is included as an argument ("<@>") to the query form 325a, allowing this compiled query to find the price of any particular id value.

In an alternative embodiment, the query processor may be configured to recognize that the "where id=5" phrase is a particular case of the more generic "where id in (5)", and will cast the skeletal query form to use the "in (<@>)" phrase instead of the "=<@>" phrase, as illustrated in query form 325b. The query processor will place the single value "5" in the argument list, and the compiled query will process the query with this single value list. Although there may be some inefficiency in the handling of a single-value match as a match to a list that contains a single value, the potential applicability of the skeletal query form 325*b* is greater than the applicability of skeletal form 325*a*, avoiding the need to create and compile a different skeletal query to handle multiple id match values.

Alternative embodiments of the query processor may be configured to pass each column identifier ("price", "id") as an argument ("<C1>", "<C2>") to the compiled skeletal query, as illustrated in skeletal query forms 325*c* and 325*d*. In query form 325*d*, the identifier of the table ("stock") is also passed as an argument ("<T>") to the compiled skeletal query.

Query 330 includes a function ("sum(price)") as a parameter of the query, and the result returned will be a sum of the prices of records in the stock table having an id value of 5, 6, or 7. As with other parameters, a function parameter may be included in the basic skeletal query form, such that the particular function is performed within the compiled skeletal query, as illustrated by query form 335*a*. Alternatively, the argument of the function ("price") may be passed as an argument ("<C1>") to the compiled skeletal query, as illustrated by query form 335*b*. In an alternative embodiment, the function name ("sum") may also be passed as an argument ("<F>"), as illustrated by the query form 335*c*.

Recognizing that function operations are often performed after the records are selected, the query processor may be configured to partition a query that includes a function call to provide a result into a sequence of operations, such as an operation (query) that identifies the values that are to be provided to the function, followed by the operation of this function on these values, as illustrated by the example query form 335*d*. In this example, all of the prices in the table stock having an id matching an entry in the argument list "<@>" are returned in a list named "List", using the "Select . . . AS <name>" option. This returned list is then passed to a "SUM" function that provides a sum of the returned prices in List.

In like manner, if the query includes a function that is used to generate a set of parameters of the query, the multi-operation process may include a function call to generate this set of parameters as a list, with this list included in the subsequent query operation. Similarly, the query processor may be configured to partition complex queries into a sequence of simpler queries, some or all of the simpler queries being provided as compiled skeletal queries.

The particular embodiment of the query parser 210 will define which of the possible skeletal query forms 315*a-c*, 325*a-d*, 335*a-d* will be generated, and all subsequent user queries of a form that match the form of the determined skeletal query will be parsed by the query processor so as to invoke the generated compiled skeletal query. For example, a query parser 210 that identifies and generates the skeletal query of 325*d* will characterize a subsequent user query of the form "Select purchasers from orders where upc=11223" as a query that corresponds to the skeletal query 325*d* with arguments <C1> of "purchasers", <T> of "orders", <C2> of "upc", and match value <@> of "11223".

On the other hand, an embodiment of the query parser 210 that identifies and generates the skeletal query of 325*c* will not characterize this example user query ("Select purchasers from orders where upc=11223") as corresponding to the skeletal query 325*c*, because the table identifier "orders" does not correspond to the non-argumented table parameter "stock" in the skeletal query 325*c* in the compiled skeletal query 325*c*. In this case, the query processor will identify the query as having a new query form, and a new skeletal query form and corresponding compiled skeletal query will be created ("Select <C1> from orders where <C2>=<@>).

One of skill in the art will recognize that any particular embodiment of the query parser 210 of FIG. 2 will parse each user's query so as to produce a particular skeletal query with a potential combination of non-argumented parameters (parameters that are 'built into' the skeletal query) and argumented parameters (parameters that are passed as arguments to the skeletal query). For a user's query to be characterized as corresponding to a previously defined skeletal query, the form of the query must match the skeletal query with non-argumented parameters (hereinafter the skeletal query form), and provide parameters that can be passed to the skeletal query as arguments that are consistent with this particular skeletal query form.

Returning to FIG. 2, the query parser 210 will provide an identifier 214 of the determined skeleton query, as well as the parameter values for each of the identified argumented parameters as query arguments 212 to the identified skeleton query. The identifier 214 of the determined skeleton query may be of the form identified in the skeleton query form column of FIG. 3, wherein each operational term (e.g. "select", "from", "where", "in") used in the query is identified, as well as the parameters that are not argumented, and an identification of the parameters that are expected to be passed as an argument to this skeletal query. Of particular note, all user queries of the same form (as defined by the query parser 210) will produce the same identifier 214, albeit with potentially different values of the query arguments 212.

The identifier 214 of the skeletal query corresponding to the received user query is passed to a skeleton compiler and retriever 220. The skeleton compiler and receiver 220 determines whether this identifier 214 matches any of prior identifiers received from the parser 210. If it does, the skeleton compiler and retriever 220 merely retrieves the compiled version of the skeletal query that was produced when the prior identifier was received and processed.

If the identifier 214 of the skeletal query does not match one of the previously received and processed identifiers, the skeleton compiler and retriever 220 initiates a process that creates a procedure corresponding to the skeletal query and provides a compiled version of this procedure.

Depending upon the expected number of different skeletal queries, the skeleton compiler and retriever 220 may be configured to execute a search for a matching skeleton query form using any of a variety of well known techniques. In a simple embodiment, for example, each identified skeletal query may be stored with the communicated identifier 214, and each subsequent skeletal query will be compared, one by one, with each of the prior identifiers 214. In another fairly simple embodiment, the initial operational command (e.g. "select") may be used to partition the skeleton queries into searchable subsets, within which the aforementioned search for matching identifiers 214 may be conducted. Similarly, secondary commands (e.g. "from tableA") may be used to further partition the skeleton queries into searchable subsets within which the search for matching identifiers 214 may be conducted.

In some embodiments, a hash value of one or more of the terms in the skeletal query form may be used to generate a unique value corresponding to each skeletal query form, or each skeletal query form within a subset. Each new skeletal query form is identified by a "null" value at a memory location identified by the hash value. As each new skeletal query is created, the value at the memory location identified by the hash value may indicate a location at which the compiled version of the skeleton query may be found. Conventional hash table techniques may be used to deal with potential duplicates of hash values.

A skeleton executor 230 is configured to execute the compiled skeleton query to an identified table 260, using the current query arguments 212. A result provider 240 is configured to return the result of the query. In some embodiments, any post-processing functions or tasks may be included within the result provider 240. For example, with regard to query 330, discussed above, if the sum(prices) function of query 330 was not included as an argument to the skeleton query, and otherwise not included in the compiled query that was executed at 230, the results provider 240 may be configured to sum the prices returned by the skeletal query code executed at 230. Alternatively, the results provider may merely return a list of the prices of the selected records/rows based on the skeletal query, and rely on the underlying database management system to execute the sum(List) function, where List is a list of the returned prices from the skeletal query.

FIG. 4 illustrates example C++ code for an example skeletal query corresponding to the example skeleton query 315a of FIG. 3 ("Select * from stock where id in(<@>)"), for execution of the user query 310 ("Select * from stock where id in(5,6,7)").

In this example, the procedure is defined at 410, using a unique procedure name ("Select_0023") to distinguish it from other compiled skeletal queries. This procedure includes, as an input argument, an array/list "MemSqlArrayParam", which is renamed in the routine as "rg", for convenience. In this example embodiment of the query processor, the elements of the list of parameters (5, 6, 7) are passed as individual parameters within the MemSqlArrayParam array, as detailed further below. The "TableEntry" input argument includes metadata that describes the table referenced by the query, such as indexes to the columns of the tables.

The code between lines 420-429 comprise "boiler plate" definitions and initializations to facilitate subsequent processing, and are substantially independent of the particular query.

The code between lines 430-439 creates an array of search keys (match values) that will be used to find records in the stock table that have these values in their id column. As noted above, the list of match values are passed to this procedure via the "MemSqlArrayParam", renamed rg. This list is of variable length, depending upon the number of match values specified in the specific query that caused this skeletal query to be invoked.

The MemSqlArrayParam array is used to convey all of the argumented parameters to the compiled skeletal procedure, and may include multiple parameters. The beginning and end of the match list within MemSqlArrayParam (rg) are identified by data items rg.offset and rg.endOffset, respectively.

The loop 431-438 steps through the list of match values, from rg.offset of rg.endOffset to obtain each of the match values and store them in appropriate form/type for comparison with the id column entries.

The code following 440 finds each record in the table stock having an id that matches one of the match values (search keys). The loop 441-449 steps through the list of match/key values from rg.offset of rg.endOffset, and the MatchedRow function identifies the rows in the table stock that have an id that matches each key, and adds them to the "MatchContext" object, which is returned as the result of the query. The "MatchedRowResult" ("res") variable indicates the status of the MatchedRow function call, including, for example, confirmation that the MatchRow function completed successfully (status="committed").

One of skill in the art will recognize that the example code of FIG. 4, using the MemSqlArrayParam as an object for passing input arguments and TableEntry as an object for passing information regarding the structure of the table, is merely an example of a technique for communicating information from a given input query to the compiled skeleton query code, and other techniques may be used. In like manner, the specific code of FIG. 4 is provided as an example of code for interfacing with a particular underlying database management system (dbms). One of skill in the art will recognize that the particular code provided in the compiled skeleton query code will be dependent upon the particular dbms and the techniques adopted to invoke the routines provided by this dbms to satisfy the skeleton query with the arguments that are passed from the input query.

The foregoing merely illustrates the principles of the invention. It will thus be appreciated that those skilled in the art will be able to devise various arrangements which, although not explicitly described or shown herein, embody the principles of the invention and are thus within the spirit and scope of the following claims.

In interpreting these claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) each of the disclosed elements may be comprised of a combination of hardware portions (e.g., including discrete and integrated electronic circuitry) and software portions (e.g., computer programming).

f) hardware portions may include a processor, and software portions may be stored on a non-transitory computer-readable medium, and may be configured to cause the processor to perform some or all of the functions of one or more of the disclosed elements;

g) hardware portions may be comprised of one or both of analog and digital portions;

h) any of the disclosed devices or portions thereof may be combined together or separated into further portions unless specifically stated otherwise;

i) no specific sequence of acts is intended to be required unless specifically indicated; and j) the term "plurality of" an element includes two or more of the claimed element, and does not imply any particular range of number of elements; that is, a plurality of elements can be as few as two elements, and can include an immeasurable number of elements.

We claim:

1. A method comprising:
receiving, at a processing system that includes a computer processor and memory, a user query for selecting data from a database;
parsing, by the processing system, the user query to identify a form of the user query and one or more arguments associated with the user query;
determining, by the processing system, whether the form of the user query corresponds to a skeletal query form of a set of skeletal query forms;
retrieving, by the processing system, a compiled skeletal query corresponding to the skeletal query form from a database, the compiled skeletal query including machine code that is executable directly by the processing system;

executing, by the processing system, the machine code corresponding to the skeletal query form using the one or more arguments associated with the user query; and returning, by the processing system, results of the execution of the machine code in response to the user query.

2. The method of claim 1, including:

creating the skeletal query form corresponding to the form of the user query with referential arguments corresponding to the identified arguments associated with the user query;

creating the compiled skeletal query corresponding to the skeletal query form for said executing of the machine code corresponding to the skeletal query form.

3. The method of claim 2, including storing the compiled skeletal query for subsequent retrieval.

4. The method of claim 1, wherein the identified one or more arguments includes a reference to a plurality of parameter arguments and the parsing of the query includes generating values of at least some of the arguments associated with the user query.

5. The method of claim 1, wherein if the form of the user query does not correspond to the form of a skeletal query of the set of skeletal query forms, the method includes submitting the user query, unaltered, to an underlying query system.

6. The method of claim 5, including, after submitting the user query to the underlying query system:

creating a new skeletal query form corresponding to the form of the user query with referential arguments corresponding to the identified arguments associated with the user query;

providing executable machine code for executing the user query with a reference to the one or more arguments associated with the user query; and storing the executable code for subsequent retrieval.

7. The method of claim 1, wherein the user query includes a search of the database for records having a parameter value equal to one or more user identified values, and the one or more arguments of the user query include the one or more user identified values.

8. The method of claim 1, wherein the user query conforms to a Structured Query Language (SQL) query.

9. A non-transitory computer readable medium that includes a computer program, which, when executed by a processing system, causes the processing system to:

receive a user query for selecting data from a database;

parse the user query to identify a form of the user query and one or more arguments associated with the user query;

determine whether the form of the user query corresponds to a skeletal query form of a set of skeletal query forms;

a compiled skeletal query corresponding to the skeletal query form, the compiled skeletal query including machine code that is executable directly by the processing system;

execute the machine code corresponding to the skeletal query form using the one or more arguments associated with the user query; and return results of the execution of the machine code in response to the user query.

10. The medium of claim 9, wherein the computer program causes the processing system to:

create the skeletal query form corresponding to the form of the user query with referential arguments corresponding to the identified arguments associated with the user query; and create the compiled skeletal query corresponding to the skeletal query form for enabling said executing of the machine code.

11. The medium of claim 10, wherein the computer program causes the processing system to store the compiled skeletal query corresponding to the new skeletal query form for subsequent retrieval.

12. The medium of claim 9, wherein the identified one or more arguments includes a reference to a plurality of parameter arguments and the parsing of the query includes generating values of at least some of the arguments associated with the user query.

13. The medium of claim 9, wherein if the form of the user query does not correspond to the form of a skeletal query of the set of skeletal query forms, the computer program causes the processing system to submit the user query, unaltered, to an underlying query system.

14. The medium of claim 13, wherein the computer program causes the processing system to subsequently, after the user query is submitted to the underlying query system:

create a new skeletal query form corresponding to the form of the user query with referential arguments corresponding to the identified arguments associated with the user query;

provide executable machine code for executing the user query with a reference to the one or more arguments associated with the user query; and store the executable code for subsequent retrieval.

15. The medium of claim 9, wherein the user query includes a search of the database for records having a parameter value equal to one or more user identified values, and the one or more arguments of the user query include the one or more user identified values.

16. The medium of claim 9, wherein the user query conforms to a Structured Query Language (SQL) query.

17. A system comprising:

a database, a query parser, and a processor, wherein:

the query parser receives a user query for selecting data from the database, and parses the user query to identify a form of the user query and one or more arguments associated with the user query; and the processor:

determines whether the form of the user query corresponds to a skeletal query form of a set of skeletal query forms, and retrieves a compiled skeletal query corresponding to the skeletal query form, the compiled skeletal query including machine code that is executable directly by the processor;

executes the machine code corresponding to the skeletal query form using the one or more arguments associated with the user query; and returns results of the execution of the machine code in response to the user query.

18. The system of claim 17, including a query compiler, and wherein:

the processor creates the skeletal query form corresponding to the form of the user query with referential arguments corresponding to the identified arguments associated with the user query; and the query compiler creates the compiled skeletal query corresponding to the skeletal query form for said executing of the machine code.

19. The system of claim 18, including a memory, and wherein the processor stores the compiled skeletal query corresponding to the skeletal query form in the memory for subsequent retrieval.

20. The system of claim 17, wherein the identified one or more arguments includes a reference to a plurality of parameter arguments and query parser generates values of at least some of the arguments associated with the user query.

21. The system of claim 17, wherein if the form of the user query does not correspond to the form of a skeletal query of the set of skeletal query forms, the processor submits the user query, unaltered, to an underlying query system.

22. The system of claim 21, including a query compiler and a memory, and wherein, after the user query is submitted to the underlying query system:

the processor creates a new skeletal query form corresponding to the form of the user query with referential arguments corresponding to the identified arguments associated with the user query;

the query compiler creates a new compiled skeletal query corresponding to the new skeletal query form, the compiled skeletal query including machine code that is executable directly by the processor; and the processor stores the new compilied skeletal query in the memory for subsequent retrieval.

23. The system of claim 17, wherein the user query includes a search of the database for records having a parameter value equal to one or more user identified values, and the one or more arguments of the user query include the one or more user identified values.

24. The system of claim 17, wherein the user query conforms to a Structured Query Language (SQL) query.

* * * * *